United States Patent
May

(10) Patent No.: US 7,262,585 B2
(45) Date of Patent: Aug. 28, 2007

(54) METHOD AND APPARATUS FOR BI-DIRECTIONAL CURRENT LIMIT IN A DUAL-POWER SOURCE CAPABLE DEVICE

(75) Inventor: Marcus W. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 281 days.

(21) Appl. No.: 11/130,675

(22) Filed: May 17, 2005

(65) Prior Publication Data
US 2006/0261788 A1    Nov. 23, 2006

(51) Int. Cl.
G05F 1/40 (2006.01)
H02H 7/00 (2006.01)
H03H 1/00 (2006.01)

(52) U.S. Cl. .......................... 323/273; 323/270; 361/18

(58) Field of Classification Search ............... 323/268, 323/270, 271, 273, 275, 276, 279, 282, 285; 363/50, 55, 56.01; 361/18
See application file for complete search history.

(56) References Cited

U.S. PATENT DOCUMENTS

| | | | |
|---|---|---|---|
| 5,574,358 A * | 11/1996 | Garrett | 323/276 |
| 5,677,558 A * | 10/1997 | McGlinchey | 257/370 |
| 6,690,147 B2 * | 2/2004 | Bonto | 323/280 |
| 6,853,171 B2 * | 2/2005 | May | 323/283 |
| 6,867,573 B1 * | 3/2005 | Carper | 323/277 |

* cited by examiner

Primary Examiner—Matthew V. Nguyen
(74) Attorney, Agent, or Firm—Garlick Harrison & Markison; Kevin L. Smith

(57) ABSTRACT

A power supply system having a transistor, a linear regulator, a DC-DC converter, and a control circuit. The transistor has an input, a substrate, a first node, and a second node. The first node is operably coupled to a non-battery power source. A linear regulator is operably coupled to the second node to produce a regulated output voltage based on the non-battery power source, when enabled. A DC-DC converter is operably coupled to produce the regulated output voltage based on a battery power source, when enabled. A control circuit is operably coupled to the input node and the substrate of the transistor wherein when the DC-DC converter is enabled, the control circuit controls a reverse leakage current of the transistor, and when the linear regulator is enabled in a zero load-state, the control circuit controls a forward leakage current of the transistor, and when the linear regulator is enabled in a non-zero load-state, the control circuit provides a current limit for the linear regulator.

18 Claims, 6 Drawing Sheets multi-media system on a chip 10 power supply module 12 power supply module 12

METHOD AND APPARATUS FOR BI-DIRECTIONAL CURRENT LIMIT IN A DUAL-POWER SOURCE CAPABLE DEVICE

TECHNICAL FIELD

This invention relates generally to power supply for portable electronic equipment and more particularly to multi-function handheld systems with a dual-power source capability used therein.

BACKGROUND

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc.

These handheld devices include one or more integrated circuits to provide the functionality of the device. For example, a thumb drive may include an integrated circuit for interfacing with a computer (for example, personal computer, laptop, server, workstation, etc.) via one of the ports of the computer (for example, Universal Serial Bus, parallel port, etc.) and at least one other memory integrated circuit (for example, flash memory). As such, when the thumb drive is coupled to a computer, data can be read from and written to the memory of the thumb drive. Accordingly, a user may store personalized information (for example, presentations, Internet access account information, etc.) on his/her thumb drive and use any computer to access the information.

Standards interface specifications provide additional device functionally by facilitating interoperability of handheld devices with host or peripheral devices. For instance, devices may be interoperably coupled as host-to-host, as host-to-peripheral, and/or as peripheral-to-peripheral.

Apart from communication interoperability, some standards interface specifications allow peripheral or handheld devices to draw at least a standby current from a host when connected thereto. For example, when a handheld MP3 player is coupled to a host computer via a USB (Universal Serial Bus) connection, the MP3 may be powered via a 5-volt source of the USB connection instead of using its battery power source. In a normal power mode, a peripheral device (for example, an MP3 player) may draw up to a 100 mA current from the 5-volt source for power. At least one version of a USB specification, however, has general interface parameters that call for limiting the current that a peripheral device may draw to a very small amount (for example, a standby current of less than 1 mA). Accordingly, a peripheral device, such as an MP3 player, should be capable of being self powered (that is, from a battery power source), being powered from a USB connection in a normal power mode, and being powered from a USB connection in a standby current mode.

Therefore, a need exists for power circuitry that accommodates multiple states for battery and non-battery power sources of a dual-power capable device such that the functionality of a peripheral or handheld device is maintained.

SUMMARY

Accordingly, provided is a power supply system responsive to multiple load states with current limiting capabilities for reverse leakage current and forward leakage current operation.

The power supply system has a transistor, a linear regulator, a DC-DC converter, and a control circuit. The transistor has an input, a substrate, a first node, and a second node. The first node is operably coupled to a non-battery power source. A linear regulator is operably coupled to the second node to produce a regulated output voltage based on the non-battery power source, when enabled. A DC-DC converter is operably coupled to produce the regulated output voltage based on a battery power source, when enabled. A control circuit is operably coupled to the input node and the substrate of the transistor wherein when the DC-DC converter is enabled, the control circuit controls a reverse leakage current of the transistor, and when the linear regulator is enabled in a zero load-state, the control circuit controls a forward leakage current of the transistor, and when the linear regulator is enabled in a non-zero load-state, the control circuit provides a current limit for the linear regulator.

DETAILED DESCRIPTION

Figure 1:
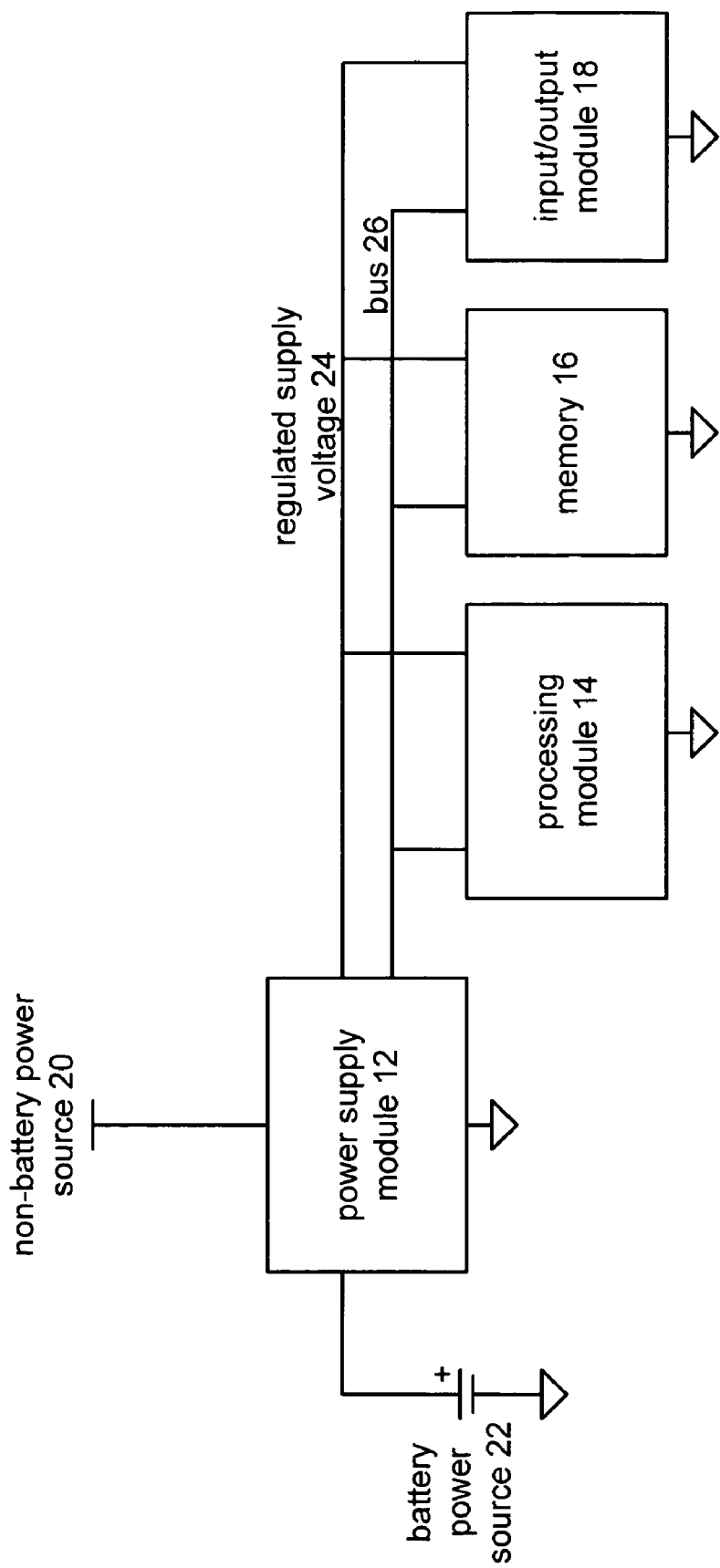
FIG. 1 is a schematic block diagram of a multi-media system on a chip ("SoC") that includes a power supply module in accordance with the present invention.

FIG. 1 is a schematic block diagram of a multi-media system on a chip ("SoC") 10 that includes a power supply module 12, a processing module 14, a memory 16, and an input/output module 18. The power supply module 12 is operably coupled to provide a regulated supply voltage 24 to the processing module 14, the memory 16 and the input/output module 18.

Generally, a system-on-a-chip is an integrated circuit that combines generic functions (for example, microcontrollers, universal asynchronous receive/transmit (UART) functions, memory, and other analog and/or digital logic functions) with custom design elements to provide a device containing major elements of a system on one integrated chip. A SoC can be implemented as an ASIC ("Application Specific Integrated Circuit"), FPGA ("Field Programmable Gate Array"), or other such logic device implementations. Accordingly, the multi-media SoC 10 is provided by way of example, as would be readily appreciated by those skilled in the art.

Operably coupled to the power supply module 12 is a non-battery power source 20 and a battery power source 22. The non-battery power source 20 may be provided by a host device coupled to a handheld device that incorporates the multi-media system on a chip 10 via an interface, which may be in accordance with one or more interface specifications, such as Ethernet protocols (such as "Power over Ethernet" under IEEE 802.3af), Firewire under IEEE 1394, Universal Serial Bus, etc. Increasingly, interface specifications are being generated for direct connection of handheld devices such as Personal Digital Assistants (PDAs), cellular phones, MP3 players, and digital cameras to one another without the need for a host PC.

As one of ordinary skill will appreciate, depending on the particular type of connection, a host interface module is used having a corresponding encoder and decoder. For example, when a handheld device including the multi-media SoC 10 is coupled to a host device via a USB cable, the host interface module includes a USB transceiver.

For convenience, device interoperability is discussed with respect to the USB specification. It should be noted, however, that other interfaces providing either communication interface specifications or communication with power interface specifications could be similarly used.

USB specifications allow for devices to draw power from a USB connection. High-power USB-compliant devices, such as a printer or scanner, would have a devoted power supply—in other words, a self-powered device. But lower-powered devices, like mice and digital cameras, may use the power available over the USB bus to simplify operation. The power generally available through a USB port is up to about 500 milliamps at about 5 volts. In the present embodiment, the 5-volt USB power supply is provided from a host computer to the multi-media SoC 10 as the non-battery power source 20.

In operation, the power supply module 12 utilizes the battery power source 22 or the non-battery power source 20 to produce the regulated supply voltage 24 for the components of the system on a chip 10, including the processing module 14, memory 16, and the input/output module 18. The power supply module 12 is discussed in further detail later herein. An aspect of the power supply module 12 is to account for use with a USB On-the-Go ("OTG") peripheral device, such as a personal digital assistants (PDA), CD players, MP3 players, DVD players, AM/FM radio, a pager, cellular telephones, computer memory extension, etc.

Generally, USB OTG compliant devices allow for interconnections between low power peripheral devices without sufficient power to drive the other—that is, the USB OTG specification provides guidelines concerning limited host capabilities for communication with other USB peripherals and concerning low power features to preserve the useful battery life of a device. For an OTG device to act as a host, it would have a software driver that can recognize and control the B-device. When two OTG devices are coupled together, however, the A-device may not have a software driver for the B-device, while the B-device does have a driver for the A-device. If the A-device continued to act as a host, then the two devices would not be able to communicate with each other. Under USB OTG specifications, a Host Negotiation Protocol ("HNP") would allow an A-device and a B-device to swap the role of host automatically, in a manner transparent to a user.

The input/output module 18 provides generic formatted data to the processing module 14 and/or the memory 16 over the bus 26. For instance, digitized audio and/or video data may be stored in the memory 16 for later playback, where the processing module 14 controls the storing of the data via a multimedia application.

The processing module 14 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 16 may be a single memory device or a plurality of memory devices. Such a memory device may be a read-only memory, random access memory, volatile memory, non-volatile memory, static memory, dynamic memory, flash memory, cache memory, and/or any device that stores digital information.

Note that when the processing module 14 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Data stored in memory 16, which may have 64 Mbytes or greater of storage capacity, may be text files, presentation files, user profile information for access to varies computer services (for example, Internet access, email, etc.), digital audio files (for example, MP3 files, WMA-Windows Media Architecture, MP3 PRO, Ogg Vorbis, AAC-Advanced Audio Coding), digital video files—for example, still images or motion video such as MPEG (motion picture expert group) files, JPEG (joint photographic expert group) files, etc.—address book information, and/or any other type of information that may be stored in a digital format.

The bus 26 may be a series of runs or paths operably coupling components on the multi-media SoC 10 that operate at a specified clock rate. The data bus 26 may have uni-lateral or bi-lateral runs operating in serial or parallel channel configurations for data transmission, as well as having a channel providing addressing and control functions between the components of the multi-media SoC 10. In addition, the regulated supply voltage 24 and/or the bus 26 may be provided to other components not residing on the multi-media SoC 10.

When the multi-media SoC 10 is operably coupled to a host device, which may be a personal computer, workstation, server, a laptop computer, a personal digital assistant, and/or any other device that may transceive data with the multi-media SoC 10, the processing module 14 is capable of performing at least one algorithm with corresponding operational instructions stored in memory 16 (and/or in memory otherwise incorporated in the processing module 14). Also, as may be readily appreciated, when the multi-media SoC 10 is coupled to a host device via the input/output module 18, which may be provided by a USB transceiver, the host device may power the multi-media SoC 10 via the non-battery power source 20 such that the battery power source 22 is unused.

As one of ordinary skill will appreciate, the multi-media SoC 10 may include a memory interface operably coupled to the bus 26 coupled to a flash memory, or the like, to extend the memory of the multi-media SoC 10. As such, in one embodiment, video, video graphics, text, and/or audio data is stored in the memory 16 and in another embodiment, video, video graphics, text, and/or audio data is at least partially stored "off-chip" in the external computer memory and retrieved as requested.

Figure 2:
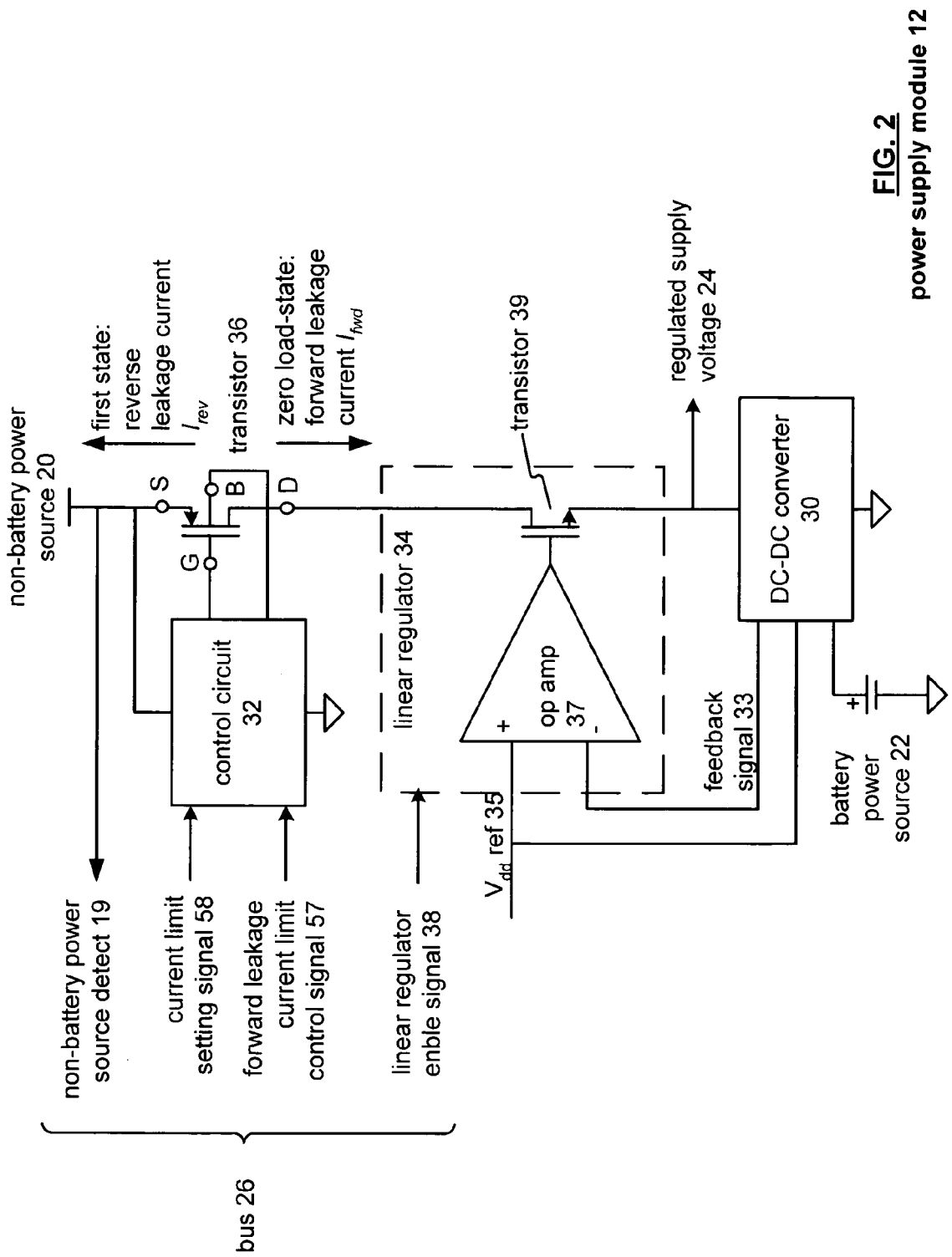
FIG. 2 is a schematic block diagram of a power supply module in accordance with the present invention.

FIG. 2 is a schematic block diagram of a power supply module 12 that includes a transistor 36, a linear regulator 34, a DC-DC converter 30, and a control circuit 32.

The transistor 36 is a P-channel power transistor having an input at a gate G, a substrate accessible by a body B, and a first node provided by a source S, and a second node provided by a drain D. The first node S is operably coupled to the non-battery power source 20. The transistor 36 operates in its linear, or triode, region. Also, as can be readily appreciated, the transistor 36, and the power supply module, may also be configured to operate in the saturation region, accordingly. In operation, the transistor 36 functions as a variable current limiter, in which the resistance of the transistor 36 is correspondingly adjusted with respect to the voltage applied to the input gate G.

The linear regulator 34 has a transistor 39 and an operational amplifier 37. The linear regulator 34 provides a substantially constant voltage output as a regulated output voltage 24 when the non-battery power source 20 is present. The linear regulator 34 is operably coupled to the second node D of the transistor 36. The linear regulator 34 has a reference input voltage $V_{dd}$ ref 35 operably coupled to a non-inverting input of an operational amplifier 37, and a feed back signal 33 coupled to the inverting input of the operational amplifier 37 such that a resulting adjustment signal from the operational amplifier 37 controls the transistor 39, which may be a zero-threshold-voltage N-channel power transistor.

The feedback signal 33 provides a representation of the regulated supply voltage 24 via a resistor divider network of the DC-DC converter 30. A linear regulator enable signal 38 is operably coupled to an input of the transistor 39 to enable or disable the linear regulator 34.

The reference input voltage $V_{dd}$ ref 35 may be implemented using a bandgap reference of the multi-media SoC 10. A suitable bandgap reference may be provided through use of a Brokaw Cell or may be constructed in accordance with the teaching of U.S. Pat. No. 6,859,156, issued Feb. 22, 2005, and titled VARIABLE BANDGAP REFERENCE AND APPLICATIONS THEREOF, which is hereby incorporated by reference.

The transistor 39 of the linear regulator 34 operates in its linear, or triode, region. Also, as can be readily appreciated, the transistor 39, and the power supply module, may also be configured to operate in its saturation region, accordingly. In operation, the transistor 39 functions as a variable resistor, in which the resistance is correspondingly adjusted with respect to an adjustment signal produced by the operational amplifier 37 such that the regulated supply voltage 24 is maintained as sufficiently constant. Note that a variety of regulator circuits, such as a switching regulator, may be implemented and that the linear regulator 34 of FIG. 2 is but one variety The DC-DC converter 30 is operably coupled to produce, when enabled, the regulated supply voltage 24 based on the batter power source 22. The DC-DC converter 30 operates to convert the DC power of the battery power source 22 voltage to another as set out for the regulated supply voltage 24. The DC-DC converter 30 may be constructed in accordance with the teaching of U.S. Pat. No. 6,204,651, titled METHOD AND APPARATUS FOR REGULATING AN OUTPUT VOLTAGE OF A SWITCH MODE CONVERTER, issued Mar. 20, 2001, which is incorporated herein by reference.

The control circuit 32 is operably coupled to the first node S, the input node G, and the substrate B of the transistor 36. A current limit setting signal 58 and a forward leakage current limit control signal 57 are provided to the control circuit 32 for different current limits to the power supply module 12.

In operation, the control circuit 32 configures the power supply module 12 to be responsive to at least three states: a reverse leakage current state, a non-zero load-state, and a zero load-state. Generally, a "load state" is an existing load specification with respect to the first node S of the transistor 36.

The non-battery power source detect 19 indicates the presence or absence of a non-battery power source 20. The processing module 14 (see FIG. 1), in response, executes an application to determine the nature of the non-battery power source 20, and the associated power supply deployment of the power supply module 12.

An example is determining whether the non-battery power source 20 is a USB connection or a conventional external power supply source. Further, other techniques or applications may be used, such as a "Plug N' Play" application, which serves to detect operably coupled ports and device. Plug N' Play also allows the device software and operating system to set the mode of operation. Drivers for the device (a computer program that facilitates another program to interact with a hardware device) can be provided to store configurations for the device to further facilitate ease-of-use.

In operation, when the DC-DC converter 30 is enabled, the control circuit 32 controls a reverse leakage current of the transistor 36. The forward leakage current limit control signal 57 and the current limit setting signal 58 are operably coupled to the control circuit 32 to provide configurable operation of the control circuit 32 with respect to the three states—the reverse leakage current state, the non-zero load-state, and the zero load-state. The forward leakage current limit control signal 57 and the forward leakage current limit control signal 57 are provided via the bus 26 (see FIG. 1). The operation of the forward leakage current limit control signal 57 and the current limit setting signal 58 are discussed in further detail with respect to FIG. 6.

In the reverse leakage state, a non-battery power source 20 is not present for use by the power supply module 12. In this state, the control circuit 32 controls a reverse leakage current $I_{rev}$ of the transistor 36. In this state, the linear regulator enable signal 38 disables the linear regulator 34.

In the non-zero load-state, a non-battery-power source 20 is present and available for use by the power supply module 12. In this state, the linear regulator 34 is enabled, and provides a regulated supply voltage 34. In this state, current limiting of the forward leakage current across the transistor 36 is implemented at a level sufficient to allow usage of the SoC 10 (see FIG. 1) in conjunction with the device operably coupled to provide the non-battery power-source 20—generally about less than 100 mA: As should be readily appreciated, the control circuit 32 may provide additional current limit levels to the transistor 36 (for example, 500 mA or greater), which is provided as an optional second non-zero load-state.

In the zero load-state, a non-battery power source 20 is present but not available for use by the SoC 10. In the zero load-state, the control circuit 32 controls a forward leakage current $I_{fwd}$ of the transistor 36. The control is near a zero current limit (for example, less than 1 mA) of the forward leakage current $I_{fwd}$, and the linear regulator 34 is enabled.

Figure 3:
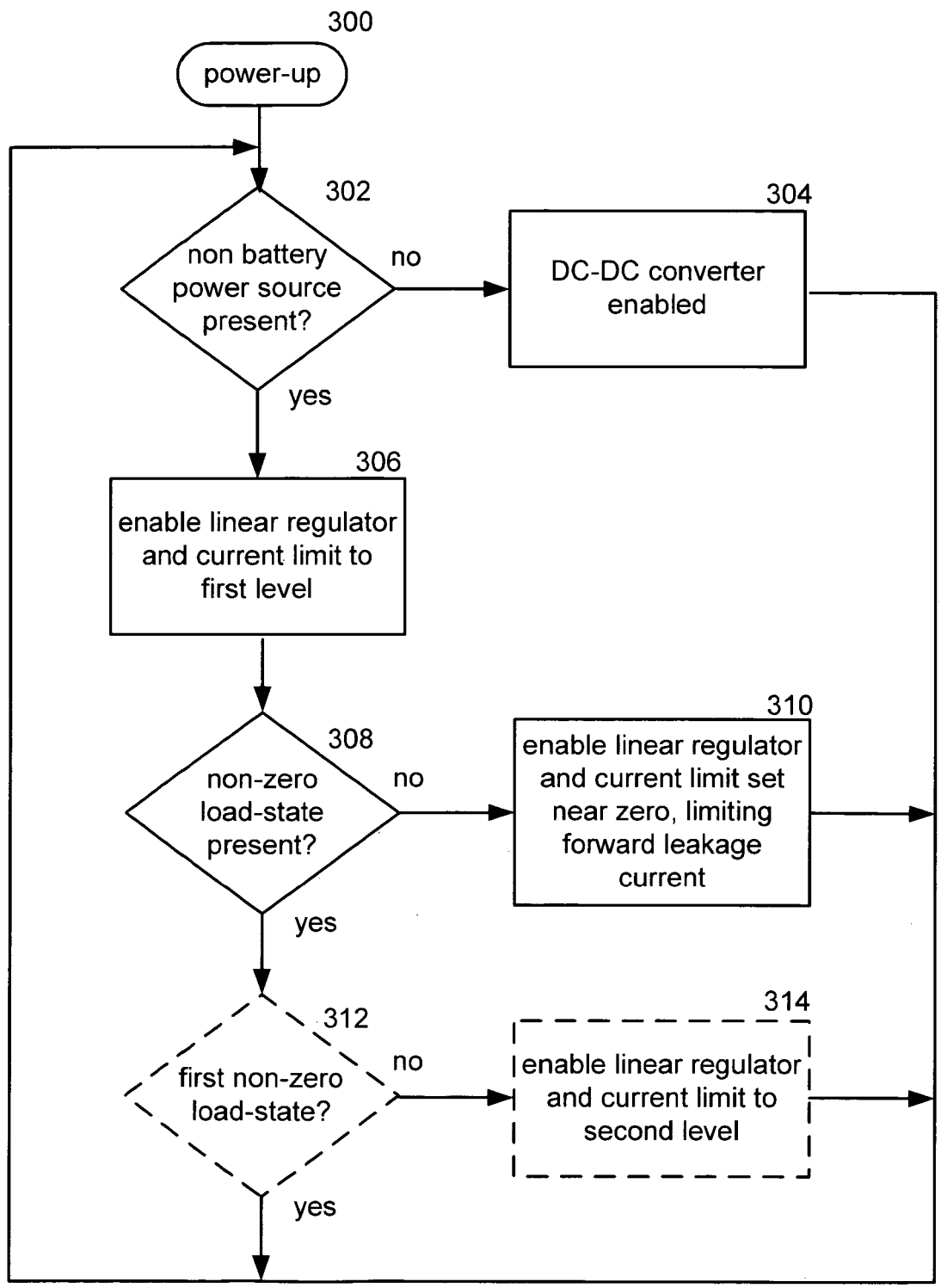
FIG. 3 is a logic diagram of a method for determining a load state and associated characteristics of the power supply module of FIG. 2.

FIG. 3 is a logic diagram of a method for determining the state of the power supply module 12 (see FIG. 2), which begins at power up with step 300. At step 302 the processing module 14 detects the presence or absence of a non-battery power source 20. If a non-battery power source is not present, the DC-DC converter is enabled and the regulated output voltage is based on the battery power source (step 304).

If a non-battery power source is present, then at step 306 the linear regulator is enabled and the current limit is set to a first level, which sufficient to allow use of the multi-media SoC 10 (see FIG. 1) in conjunction with the device that is operably coupled to provide the non-battery power-source 20—generally about 100 mA. The non-battery power source may be provided in accordance with a communications protocol—for example, with one or more Ethernet protocols (such as "Power over Ethernet" under IEEE 802.3af), "Firewire" under IEEE 1394, Universal Serial Bus, and other protocols with power provisioning specifications.

At step 308, a determination is made whether the application, which is executable by processing module 14 (see FIG. 1), places the state of the power supply module in a non-zero load-state. If there is not a non-zero load-state—that is, a zero load-state—where a non-battery power source 20 is present but not accessible for power use by the SoC 10, then at step 310 the linear regulator 24 is enabled and the current limit is set near zero to minimize the forward leakage current of the transistor 36 (see FIG. 2).

For example, a zero load-state exists for a USB OTG configuration. When connecting handheld or peripheral devices under USB OTG, one device accepts an A-device designation and acts as a host, while the other accepts the B-device designation and acts as a peripheral. Generally, the A-device is responsible for outputting power to the B-device; however, under USB OTG, the OTG A-device provides low level power (for example, at about 8 mA) to a USB bus when the OTG A-device and the OTG B-device communicate. For this USB OTG example, in step 308 where a determination is made as to whether a non-zero load-state is present, the determination is whether the non-battery power source 20 is provided from either an "OTG A-device" (and the OTG B-device does not take power) or a USB "host-device."

If at step 308 a determination is made that the power supply module should be in a non-zero load-state, then a determination is made whether the non-zero load-state is a first non-zero load-state (step 312).

If a non-zero load-state is not present, then the power supply module 12 is placed in a zero load-state in which a non-battery power source is present, but not available for use. For example, in a zero load-state, the non-battery power source is not "host provided," but instead provided by an OTG device. At step 310, the linear regulator is enabled, and the current limit is set near zero, limiting a forward leakage current of the power supply module. Otherwise, a non-zero load-state is present, and the current limit is at the first level.

In step 312, an optional state, as indicated by the dashed lines, is provided for further current limit values. At step 312 a determination is made whether a first non-zero load-state is used. If not, the state is at a second non-zero load-state, then at step 314 the linear regulator is enabled and the current limit is set to a second level (for example, 500 mA). For example, a second non-zero load-state provides for a high power USB host or external power-outlet converter, where additional power is available to the SoC 10. Otherwise, the non-battery power source is at the first non-zero load-state, the linear regulator and current limit is at the first level (for example, 100 mA), as established at step 306.

As one skilled in the art will appreciate, the determining of a load state for the power supply module 12 (see FIG. 2) and load state characteristics may be performed periodically or as called for by the execution of applications by processor 14. The executed applications act to detect the disconnection or connection of a non-battery power source 20 via the non-battery power source detect 19, as well as the nature of the non-battery power source 20 and the associated power supply deployment of the power supply module 12.

Figure 4:
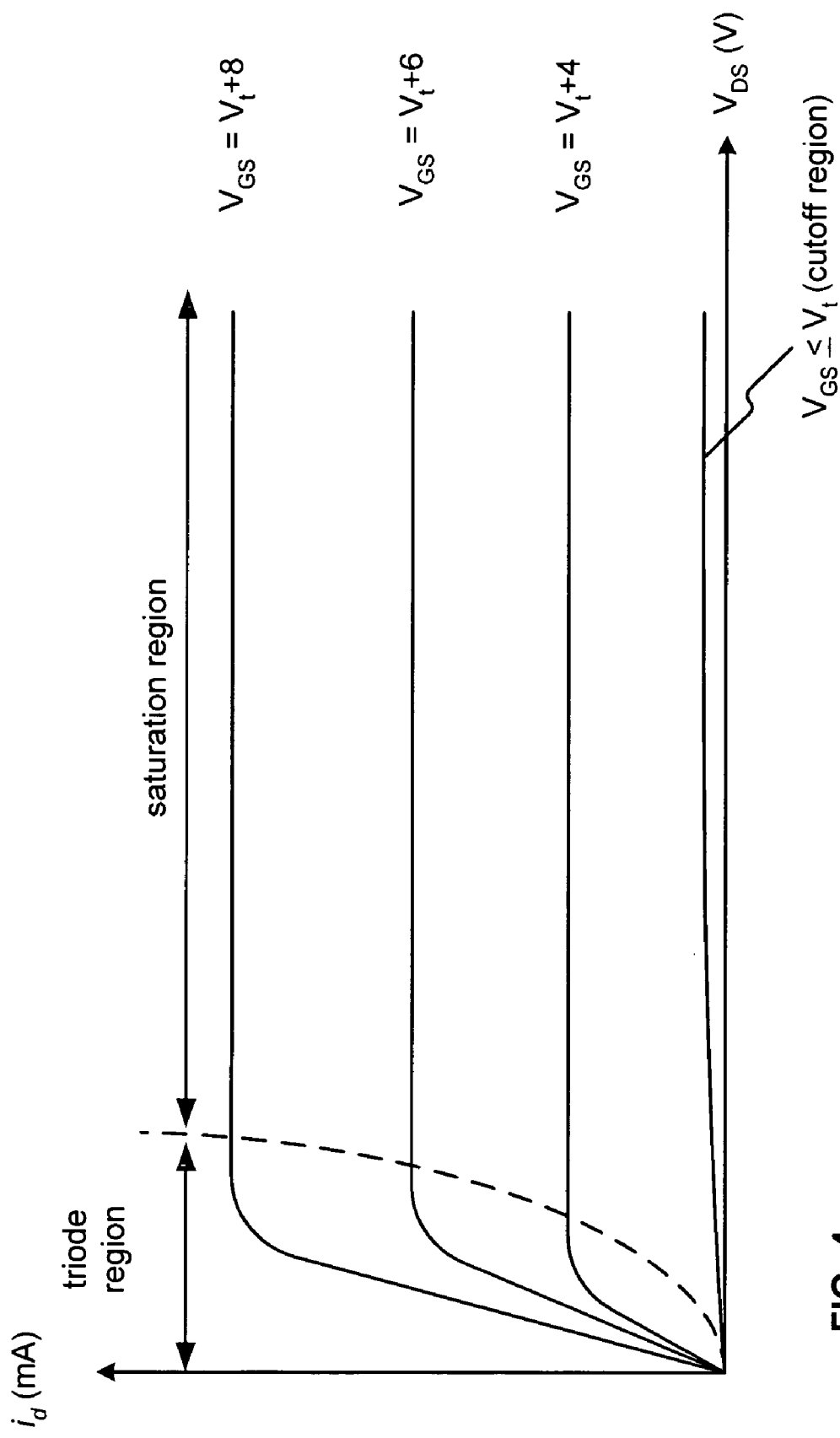
FIG. 4 is a schematic block diagram of a control circuit of the power supply module of FIG. 2.

FIG. 4 is a graph depicting drain current $I_D$ versus drain-to-source voltage $V_{DS}$ characteristics for transistors such as transistor 36. For example purposes, FIG. 4 depicts the current-voltage characteristics of an N-channel transistor device. The current-to-voltage characteristics illustrate the variable resistance capability of the transistor 36 and that of the transistor 39 of the linear regulator 34 (see FIG. 2).

As shown, a transistor has operational parameters consisting of a gate voltage $V_{GS}$, a drain voltage $V_{DS}$, and a threshold voltage Vt. These operational parameters are biased to place a transistor into three operational regions—the triode region, the saturation region or the cutoff region.

In general, the threshold voltage Vt is the minimum gate voltage required to induce the channel of a transistor. A conducting channel of a transistor calls for a positive gate voltage $V_{GS}$ of an N-channel device to exceed the threshold value Vt. Similarly, a P-channel device (made on an N-type substrate with P-type source and drain implants or diffusions) calls for a gate voltage more negative than some threshold voltage Vt value to induce the desired positive charge in the transistor channel. The threshold voltage Vt value is controlled during device fabrication and typically can be in the range from about 0.5 to about 3.0 volts.

The transistor 36 (see FIG. 2) is biased to operate in the triode and cutoff region. Also, as can be readily appreciated, the transistor 36, and the power supply module, may also be configured to operate in its saturation region, accordingly. With an N-channel device for example, the triode region operation exists when the gate-source voltage $V_{GS}$ is greater than the threshold voltage Vt and the drain voltage $V_{DS}$ is lower than the voltage at the input node G, or the gate voltage $V_{GS}$, by at least the threshold voltage Vt level.

The cutoff region where the gate-to-source voltage is less than the threshold voltage Vt, as shown in FIG. 4, is exaggerated to better illustrate with respect to the other $V_{GS}$ curves of (a) $V_{GS}$ equals Vt+4, (b) $V_{GS}$ equals Vt+6, and (c) $V_{GS}$ equals Vt+8.

Though in the cutoff region, the transistor 36 may have across it a leakage current due to the presence of a bias potential across the second node D and the first node S, although the transistor 36 is in an "off" state. The magnitude of a leakage current is a function of the temperature, supply voltage, device size, and process parameters out of which the threshold voltage Vt of the transistor has a dominant influence.

Generally, a leakage current may have undesired noise or interference with respect to the data transmission over an interface and cause unnecessary power consumption. Accordingly, the current limit module 44 of the power supply module 12 provides a current limit function to mitigate the influence of a leakage current across the transistor 36, as is discussed further in reference to FIG. 5.

Figure 5:
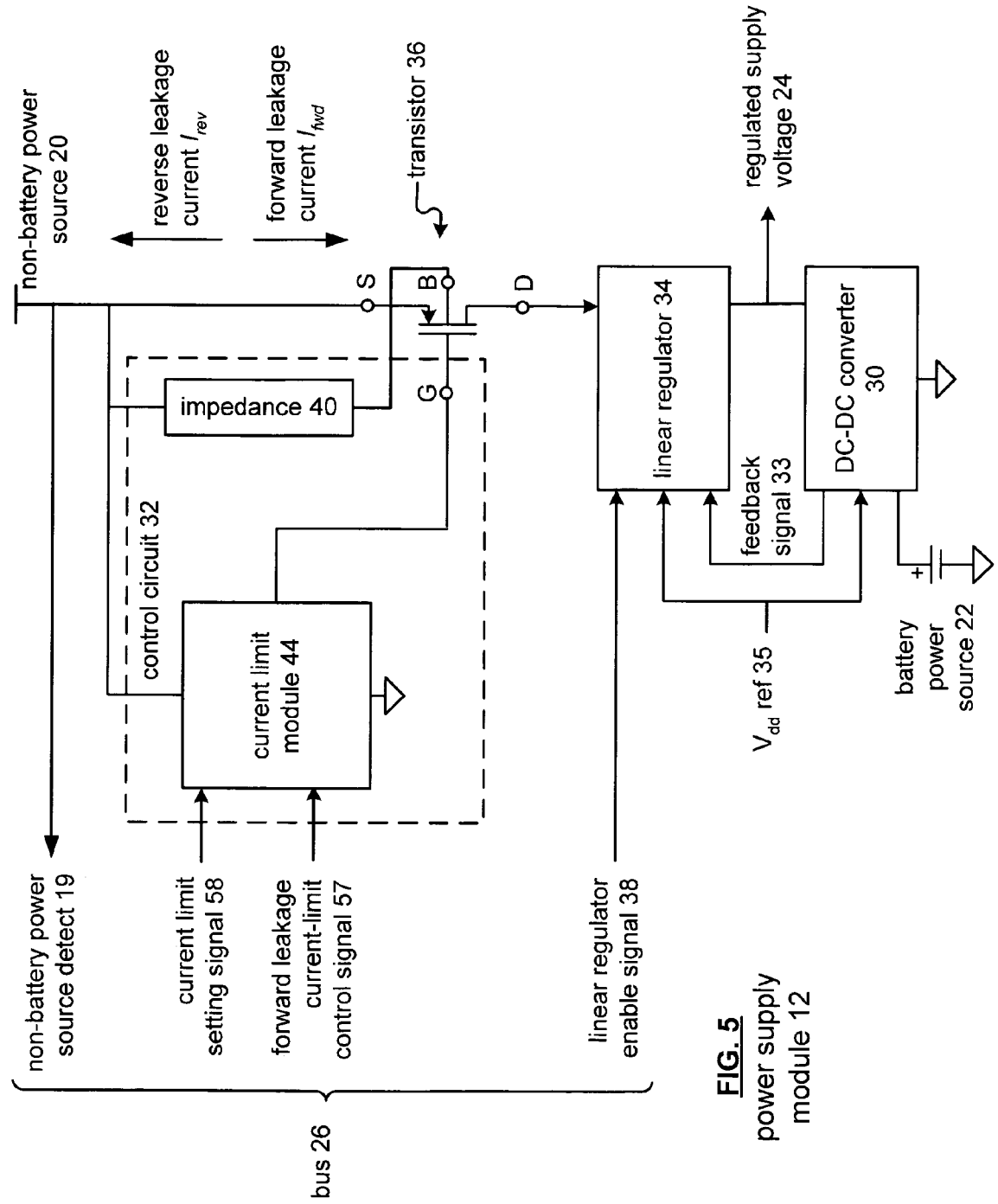
FIG. 5 is a graph depicting drain current ID versus drain-to-source voltage VDS characteristics for transistors of the power supply module of FIG. 2.

FIG. 5 is a schematic block diagram of a control circuit 32, a transistor 36, a linear regulator 34, and a DC-DC converter 30. The control circuit 32 includes an impedance 40 and a current limit module 44. As discussed above, provided by the power supply module 12 are three states of operation: a reverse leakage current state, a non-zero load-state, and a zero load-state. As discussed previously, an optional second non-zero load-state may also be provided.

The linear regulator enable signal 38 is provided through the bus 26. In the reverse leakage current state, the linear regulator enable signal 38 disables the linear regulator 34. In the reverse leakage current state, when the DC-DC converter is enabled, the control circuit 32 controls a reverse leakage current $I_{rev}$ of the transistor 36. The impedance 40 limits the reverse leakage current of transistor 36 to a negligible amount (for example, less than 1 mA). As one of ordinary skill in the art will appreciate, the value of impedance 40 can be selected to provide a sufficient current limit to the reverse leakage current.

When placed in the zero load-state or the non-zero load-state, the linear regulator enable signal 38 removes a disabling gate-source voltage from the input G of the transistor 36. With the disabling gate-source voltage removed from the transistor 36, the current limit module 44 of the control circuit 32 controls the gate-source voltage of transistor 36 based on a current limit setting of a zero load-state or a non-zero load-state.

In particular, the current limit module 44, which is operated through the current limit setting signal 58 and the forward leakage current limit control signal 57 provided via the bus 26, controls the gate-source voltage such that the transistor 36 functions as a variable current limiter, in which the transconductance (the control of a current across the first node S and the second node D) of the transistor 36 is correspondingly adjusted with respect to the voltage applied to its input G. For instance, the transistor 36 may be controlled to provide a predetermined current limit for a first non-zero load-state, an optional second non-zero load-state, and a zero load-state.

In the first or the optional second non-zero load-state, a non-battery power source 20 is present and is available to provide the regulated supply voltage 24. The control circuit 32 provides a current limit for the linear regulator 34. The current limit module 44 provides a gate-source voltage greater than the threshold voltage Vt of the transistor 36 to provide a first level of current limiting of the transistor 36 (such as 100 mA). For example, with reference to FIG. 4, the current limit module 44 may produce a gate-source voltage $V_{GS}$ corresponding to the curve labeled $V_{GS}=V_T+4$. In this manner, the current is permitted to flow up to the desired current limit, across the transistor 36, utilizing the non-battery power source 20.

In a second non-zero load-state, which is optional, the current limit module 44 provides a gate-source voltage $V_{GS}$ greater than in the first non-zero load-state to provide a second level of current limiting of the transistor 36 (for example, 500 mA or greater). That is, with reference to FIG. 4, the current limit module 44 may produce a gate-source voltage corresponding to the curve labeled $V_{GS}=V_T+8$.

In the zero load-state, a non-battery power source 20 is present but unavailable for use. The control circuit 32 controls a forward leakage current $I_{fwd}$ of the transistor 36. The linear regulator 34 is enabled by the linear regulator enable signal 38. The forward leakage current limit control signal 57 has the current limit module 44 provide a gate-source voltage $V_{GS}$ of the transistor 36. The gate-source voltage $V_{GS}$ is sufficient to limit the current available to the linear regulator to a negligible amount (for example, less than 1 mA), minimizing the forward leakage current $I_{fwd}$ at the first node S of the transistor 36.

Figure 6:
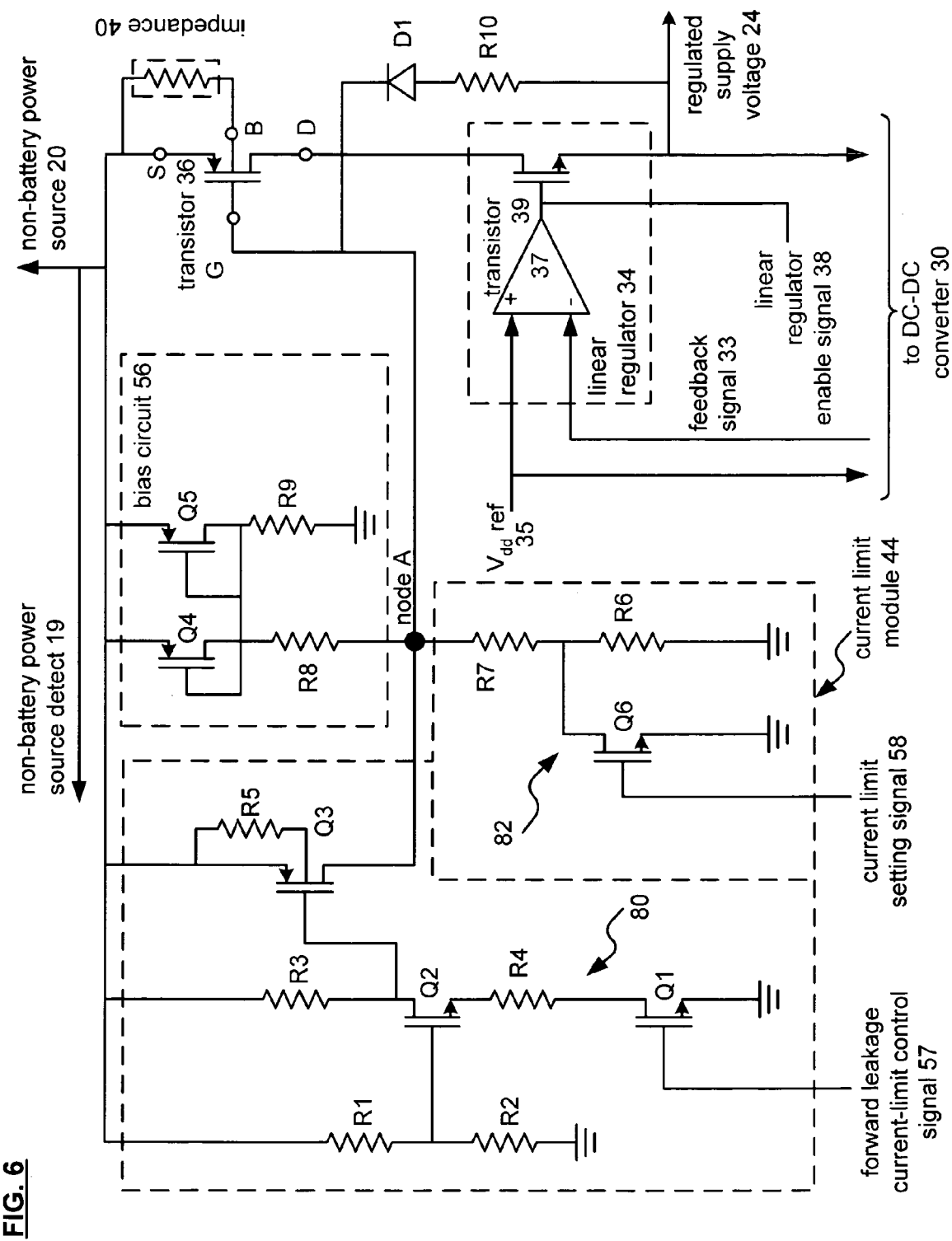
FIG. 6 is a schematic diagram of a control circuit in accordance with the present invention.

FIG. 6 is a schematic diagram of the control circuit 32 having a current limit module 44 operably coupled to the input of transistor 36 and an impedance 40 coupled to a substrate node B and first node S of the transistor 36. The current limit module 44 has a forward leakage current-limit control circuit 80 and a current limit setting circuit 82. For clarity, the node A illustrates the operational interaction forward leakage current-limit control circuit 80 and the current limit setting circuit 82 of the current limit module 44 with the transistor 36. The current limit module 44 provides a current limit via the transistor 36 with respect to the forward leakage current-limit control signal 57 and the current limit setting signal 58.

A bias circuit 56 provides an operational-bias state for the transistor 36 via node A. The bias circuit 56 has a transistor Q4 and a transistor Q5, which are P-channel devices. The transistor Q5 is configured as a diode to provide current to node A via transistor Q4. When in a non-zero load-state, the bias circuit 56 provides a bias voltage to the node A—providing the operational state of the transistor 36.

A forward leakage current-limit control circuit 80 of the current limit module 44 has a transistor Q1, Q2, Q3, and resistors R1, R2, R3, R4, and R5. The transistor Q1 is operably coupled to the forward leakage current-limit control signal 57. The transistor Q2 is operably coupled to the transistor Q1 for overvoltage purposes, in that the transistor Q2 is biased, in a non-zero load-state, at a lower voltage due to the voltage divider provided by resistors R1 and R2. In this regard, the transistor Q1 is protected from the voltage of a non-battery power source 20. The transistor Q3 is operably coupled to a node of transistor Q2 such that when Q3 is placed in an active state through the linear regulator enable 38, a sufficient voltage is applied at the input of the transistor Q3 to turn "on." In this manner, transistor Q3 "pulls-up" to drive a voltage at node A and accordingly, the input G of the transistor 36.

A current limit setting circuit 82 of the current limit module 44 has a transistor Q6 and resistors R7 and R6. The transistor Q6 is operably coupled to respond correspondingly with the current limit setting signal 58. The transistor Q6 has a node operably coupled to a ground reference, and a second node coupled to node A via a voltage divider provided by resistors R7 and R8.

In operation, the impedance 40 and the current limit module 44 of the control circuit 32 provide current limits for the states of the non-battery power source 20: the reverse leakage current state, the first non-zero load-state, the second non-zero load-state, and the zero load-state.

In the reverse leakage current state in which a non-battery power source 20 is not present, the node of the non-battery power source 20 is operably coupled to ground via the resistor circuit having resistors R1 and R2. In this configuration, the transistors 36 and 39 are susceptible to current leakage by at least two transistor components: the well diode and the transistor action.

As an example, due to the presence of a voltage at the regulated supply voltage 24, a leakage current flows from transistor 39 towards the second node D of the transistor 36 and across the transistor 36. The leakage current institutes a voltage at the second node D, tending to place transistor 36 in an unsolicited active or "on" state.

The diode D1 and the current limiting resistor R10 is operably coupled in series to the regulated supply voltage 24 and the input G of the transistor 36 to provide an elevated voltage to the input G of the transistor at a magnitude sufficient to maintain the transistor 36 in an "off" state.

In the reverse leakage current state, the DC-DC converter 30 is in operation, and accordingly, the regulated supply voltage 24 is based on a battery power source via the DC-DC converter 30 (see also FIG. 2). The linear regulator enable signal 38 provides a disabling gate-source voltage $V_{GS}$ to the transistor 39. A current limiting for a reverse leakage current across the transistor 36 is provided by the impedance 40.

In a non-zero load-state—where a non-battery-power source 20 is present and available for use by the power supply module 12 (see FIG. 2), the linear regulator 34 is enabled, and provides a regulated supply voltage 24. A current limit is provided for the linear regulator by the transistor 36 at a level sufficient to allow power usage by the SoC 10 (see FIG. 1) in conjunction with the device, such as a USB host-device, operably coupled to provide the non-battery power-source 20—generally about 100 mA.

A first and a second current limit setting is provided by the current limit setting circuit 82 having a transistor Q6 and resistors R6 and R7, which are operably coupled to the input G of the transistor 36 via node A. The transistor Q6 is turned "off" by a logic "low" from the current limit setting signal 58, providing lower voltage to the input G of the transistor 36 due to the resistance divider circuit provided by resistors R6 and R7 of the current limiting circuit, and R8, respectively. The resistor values of the resistance divider circuit are selected such that the voltage provided to the input G of the transistor 36 generates a sufficient current limit, such as about 100 mA.

In a second non-zero load-state, which is optional, the current limit setting circuit 82 of the current limit module 44 provides a gate-source voltage $V_{GS}$ greater than in the first non-zero load-state to provide a second level of current limiting of the transistor 36 (for example 500 mA or greater).

In the zero load-state, a non-battery power source 20 is present, but is unavailable for use by the power supply module 12. In this state, current limiting of the transistor 36 is set approximate to zero to minimize the forward leakage current across the transistor 36, and the linear regulator 34 is enabled via the linear regulator enable signal 38. A "zero current limit" is where a resulting current, if any, is negligible with respect to operation of the circuit.

An example where the zero load-state is used in the direct connection of peripherals and mobile devices, such as Personal Digital Assistants (PDAs), cellular phones, MP3 players, and digital cameras, to one another without the need for a host PC. Under the USB OTG specification, power from the A-device "host peripheral" is unavailable to the peripheral acting as a B-device, such as the SoC 10.

Under the USB OTG specification, one device acts as an A-device and acts as a host, while the other acts as a B-device and acts as a peripheral. The A-device is always responsible for outputting power to the B-device; however, the A-device provides power only at about 8 mA, to a USB bus when the A-device and the B-device communicate.

With the zero load-state, the forward leakage current-limit control circuit 80 provides a forward leakage current limit via the transistor 36. The forward leakage current-limit control signal 57 of the forward leakage current-limit control circuit 80 is at a logic "high," which turns transistor Q1 "on." Turning transistor Q1 "on" causes transistor Q3 to turn "on," pulling current through transistor Q2 and the resistors R3 and R4. Resistors R3 and R4 are sized such that the voltage across the resistor R3 is sufficiently high to turn on transistor Q3 "hard." In turn, the transistor Q3 serves as a pull-up transistor, pulling up the voltage at node A. The current provided by the transistor Q4 to the node A is at such a level that the logic state of the current limit setting signal 58 is a logical "do not care." In other words, the current level provided at node A by the transistor Q3 effectively overpowers the current provided by the current limit module 44. For the purpose of power conservation, the current limit setting signal 58 is placed at a logic low.

Due to the voltage level applied to the input G of the transistor 36, the transistor 36 is placed at a hard "off" state wherein the current limit is set near zero to minimize the forward leakage current across the transistor 36, and the linear regulator 34 is enabled.

Accordingly, the current limit module 44 and the impedance 40 of the control circuit 32 provide three operational states, with an additional optional current limit state. In this manner, the control circuit 32 provides a handheld or peripheral device to have expanded interface functionality with multiple power states: a self powered state (that is, from the battery power source), an externally powered state provided by an external interface connection to a non-battery power source for normal power mode of the SoC 10 (see FIG. 1), and a standby current mode drawing limited current from an external interface connection.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal. While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The preceding discussion has presented a method and apparatus for a bi-directional current limit in a dual-power source capable device. In general this is achieved by a control circuit operably coupled to the input and the substrate of a transistor. When a DC-DC converter is enabled in a reverse leakage current state, the control circuit controls a reverse leakage current of the transistor. When the linear regulator is enabled in a first non-zero load-state, the control circuit provides a first current limit for a linear regulator. When the linear regulator is enabled in a second non-zero load-state, which is optional, the control circuit provides a second current limit for the linear regulator. When the linear regulator is enabled in a zero load-state, the control circuit controls a forward leakage current of the transistor. As one of average skill in the art will appreciate, other embodiments may be derived from the teachings of the present invention without deviating from the scope of the claims.

What is claimed is:

1. A power supply system comprises:
   a transistor having an input, a substrate, a first node, and a second node, the first node operably coupled to a non-battery power source;
   a linear regulator operably coupled to the second node to produce a regulated output voltage based on the non-battery power source, when enabled;

a DC-DC converter operably coupled to produce the regulated output voltage based on a battery power source, when enabled; and a control circuit operably coupled to the input node and the substrate of the transistor wherein when the DC-DC converter is enabled, the control circuit controls a reverse leakage current of the transistor, and when the linear regulator is enabled in a zero load-state, the control circuit controls a forward leakage current of the transistor, and when the linear regulator is enabled in a non-zero load-state, the control circuit provides a current limit for the linear regulator.

2. The power supply system of claim 1 wherein the control circuit comprises:
an impedance operably coupled to the substrate and to the first node of the transistor to control the reverse leakage current across the transistor.

3. The power supply system of claim 2 wherein the control circuit further comprises
a current limit module operably coupled to the input of the transistor, wherein the current limit module provides, in the zero load-state, a first voltage less than the threshold voltage of the transistor, the current limit module provides, in the non-zero load-state, a second voltage greater than the threshold voltage of the transistor, but less than a saturation voltage of the transistor, to provide a first level of current limiting of the transistor.

4. The power supply system of claim 3 wherein the current limit module further functions to:
provide a third voltage that is greater than the threshold voltage but less than the saturation voltage to the input of the transistor when in a second non-zero load-state to provide a second level of current limiting of the transistor.

5. The power supply system of claim 3 wherein the current limit module further functions to:
provide a third voltage that is greater than the saturation voltage to the input of the transistor when in a second zero load-state to provide a second level of current limiting of the transistor.

6. The power supply system of claim 3 wherein the current limit module comprises at least one of:
a pull-up transistor operably coupled to the input of the transistor; and
a pull-down transistor operably coupled to the input of the transistor.

7. A linear regulator circuit with a bi-directional current limit comprises:
a transistor having an input, a substrate, a first node, and a second node, the first node operably coupled to a power source;
a linear regulator operably coupled to the second node to produce a regulated output voltage based on the power source, when enabled; and
a control circuit operably coupled to the input node and the substrate of the transistor wherein when the linear regulator is disabled, the control circuit controls a reverse leakage current across the transistor, and when the linear regulator is enabled in a zero load-state, the control circuit controls a forward leakage current across the transistor, and when the linear regulator is enabled in a non-zero load-state, the control circuit provides current limit for the linear regulator.

8. The linear regulator circuit of claim 7 wherein the control circuit comprises:
an impedance operably coupled to the substrate and to the first node of the transistor to control the reverse leakage current across the transistor.

9. The linear regulator circuit of claim 8 wherein the control circuit further comprises
a current limit module operably coupled to the input of the transistor, wherein the current limit module provides, in the zero load-state, a first voltage less than the threshold voltage of the transistor, the current limit module provides, in the first non-zero load-state, a second voltage greater than the threshold voltage of the transistor, but less than a saturation voltage of the transistor, to provide a first level of current limiting of the transistor.

10. The linear regulator circuit of claim 9 wherein the current limit module further functions to:
provide a third voltage that is greater than the threshold voltage but less than the saturation voltage to the input of the transistor when in the non-zero load-state to provide a second level of current limiting of the transistor.

11. The linear regulator circuit of claim 9 wherein the current limit module further functions to:
provide a third voltage that is greater than the saturation voltage to the input of the transistor when in a non-zero load-state to provide the second level of current limiting of the transistor.

12. The linear regulator circuit of claim 9 wherein the current limit module comprises at least one of:
a pull-up transistor operably coupled to the input of the transistor; and
a pull-down transistor operably coupled to the input of the transistor.

13. A multi-media system on a chip comprising:
a processing module;
a memory;
an input/output module; and
a power system module, operably coupled to provide a regulated supply voltage to the processing module, the memory, and the input/output module, wherein the power system module includes:
a transistor having an input, a substrate, a first node, and a second node, the first node operably coupled to a non-battery power source;
a linear regulator operably coupled to the second node to produce a regulated output voltage based on the non-battery power source, when enabled;
a DC-DC converter operably coupled to produce the regulated output voltage based on a battery power source, when enabled; and
a control circuit operably coupled to the input node and the substrate of the transistor wherein when the DC-DC converter is enabled, the control circuit controls a reverse leakage current across the transistor, and when the linear regulator is enabled in a zero load-state, the control circuit controls a forward leakage current across the transistor, and when the linear regulator is enabled in a non-zero load-state, the control circuit provides current limit for the linear regulator.

14. The multi-media system on a chip of claim 13 wherein the control circuit comprises:
an impedance operably coupled to the substrate and the input of the transistor to control the reverse leakage current of the transistor.

15. The multi-media system on a chip of claim 14 wherein the control circuit further comprises a current limit module operably coupled to the input of the transistor, wherein the current limit module provides, in the zero load-state, a first voltage substantially equal to the threshold voltage of the transistor, the current limit module provides, in the non-zero load-state, a second voltage greater than the threshold voltage of the transistor, but less than a saturation voltage of the transistor, to provide a first level of current limiting of the transistor.

16. The multi-media system on a chip of claim 15 wherein the current limit module further functions to:

provide a third voltage that is greater than the threshold voltage but less than the saturation voltage to the input of the transistor when in the non-zero load-state to provide a second level of current limiting of the transistor.

17. The multi-media system on a chip of claim 15 wherein the current limit module further functions to:

provide a third voltage that is greater than the saturation voltage to the input of the transistor when in the non-zero load-state to provide a second level of current limiting of the transistor.

18. The multi-media system on a chip of claim 15 wherein the current limit module comprises at least one of:

a pull-up transistor operably coupled to the input of the transistor; and a pull-down transistor operably coupled to the input of the transistor.

* * * * *